UNITED STATES PATENT OFFICE.

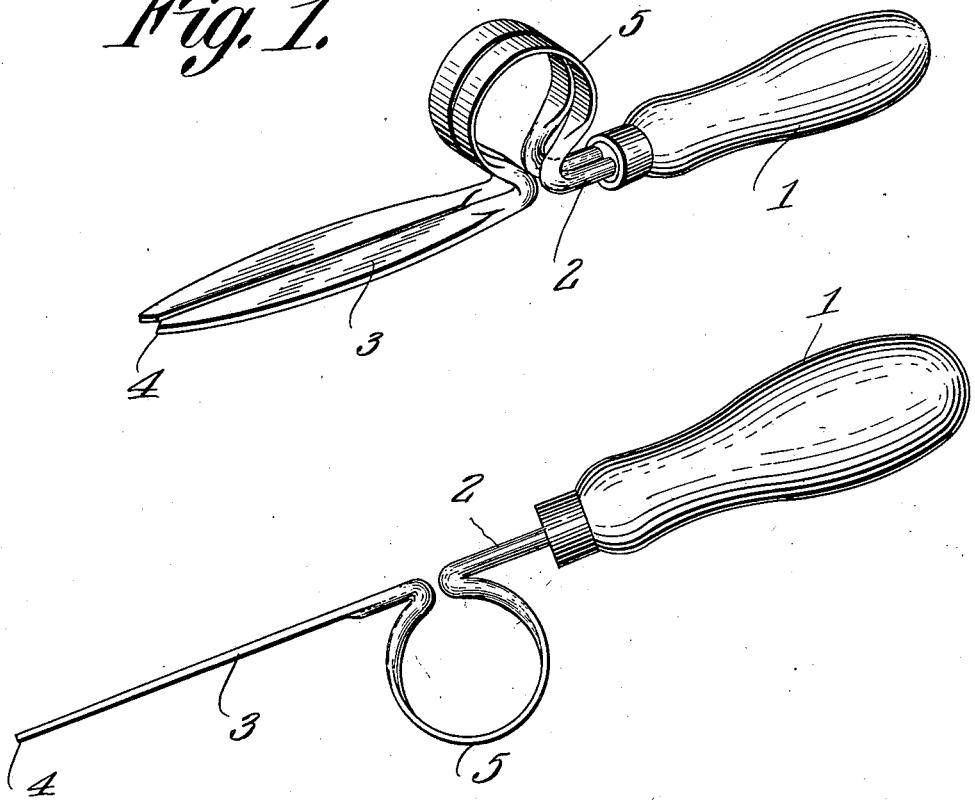

WILLIAM P. FOX, OF LOS ANGELES, CALIFORNIA.

WEEDING IMPLEMENT.

1,007,656.     Specification of Letters Patent.     Patented Oct. 31, 1911.

Application filed February 13, 1911. Serial No. 608,219.

*To all whom it may concern:*

Be it known that I, WILLIAM P. Fox, a citizen of the United States, residing at Los Angeles, in the county of Los Angeles and State of California, have invented a new and useful Weeding Implement, of which the following is a specification.

This invention has relation to weeding implements and consists in the novel construction and arrangement of its parts as hereinafter shown and described.

The object of the invention is to provide a weeding implement of simple structure which includes a pair of juxtaposed resilient tines having pointed ends and provided at points intermediate their ends with loops upon which the weeder may be turned as a lever when prying the roots of the weeds from the ground. The tines are secured to a handle which serves as the power end of the lever when the weeder is used as such.

In the accompanying drawing:—Figure 1 is a perspective view of the weeder. Fig. 2 is a side elevation of the same.

The weeder consists of a handle 1 in which is inserted the ends of tines 2. The said tines are of metal and possess a certain amount of resiliency. The outer ends of the tines 2 are flat as at 3 and are pointed at their extremities as at 4. The tines have their flattened portions 3 lying approximately in the same plane and the tines are provided at points intermediate their ends with laterally disposed loops 5 formed of the bars of metal of which the said tines are composed. By such an arrangement it will be seen that an operator may project the pointed ends 4 of the tines 2 into the ground so that the roots of a weed are received between the inner edges of the flattened portions 3. The loops 5 are then borne down against the surface of the ground and the weeder is converted into the lever the power end of which consists of the handle 1 and the working end thereof being portions of the tines 2 projected into the soil under or about the roots of the weed. Therefore it will be seen that by pressing downward upon the handle 1 the weed may be readily lifted so that its root is brought above the surface of the ground. The weed thus lifted above the surface of the ground has its roots clamped between the inner edges of the flat portions 3 but the operator may readily slip the weed from between the said flattened portions whereby the weeding operation may be repeated.

Having described the invention what I claim as new and desire to secure by Letters Patent is:—

A weeder comprising a handle, juxtaposed resilient tines secured thereto and having pointed extremities, said tines being looped laterally of each other at points intermediate their ends to form a resilient fulcrum for the weeder.

In testimony that I claim the foregoing as my own, I have hereto affixed my signature in the presence of two witnesses.

WILLIAM P. FOX.

Witnesses:
   E. B. COIL,
   DAVID FINKS.

---

Copies of this patent may be obtained for five cents each, by addressing the "Commissioner of Patents, Washington, D. C."